Nov. 21, 1944. J. P. POPOFF 2,363,201

VARIABLE SPEED EPICYCLIC GEAR TRANSMISSION

Filed March 17, 1943

Inventor

John Peter Popoff

Patented Nov. 21, 1944

2,363,201

UNITED STATES PATENT OFFICE 2,363,201

VARIABLE SPEED EPICYCLIC GEAR TRANSMISSION

John Peter Popoff, Milwaukee, Wis.

Application March 17, 1943, Serial No. 479,421

3 Claims. (Cl. 74—282)

The invention relates to an epicyclic gear transmission for motor vehicles (or other machines) designed to give infinitesimal variation of the velocity ratio of the driven shaft relative to the driving engine shaft and also to give an automatic regulation of the load on the engine which is subjected to constantly varying gradient loading.

Figure 1:
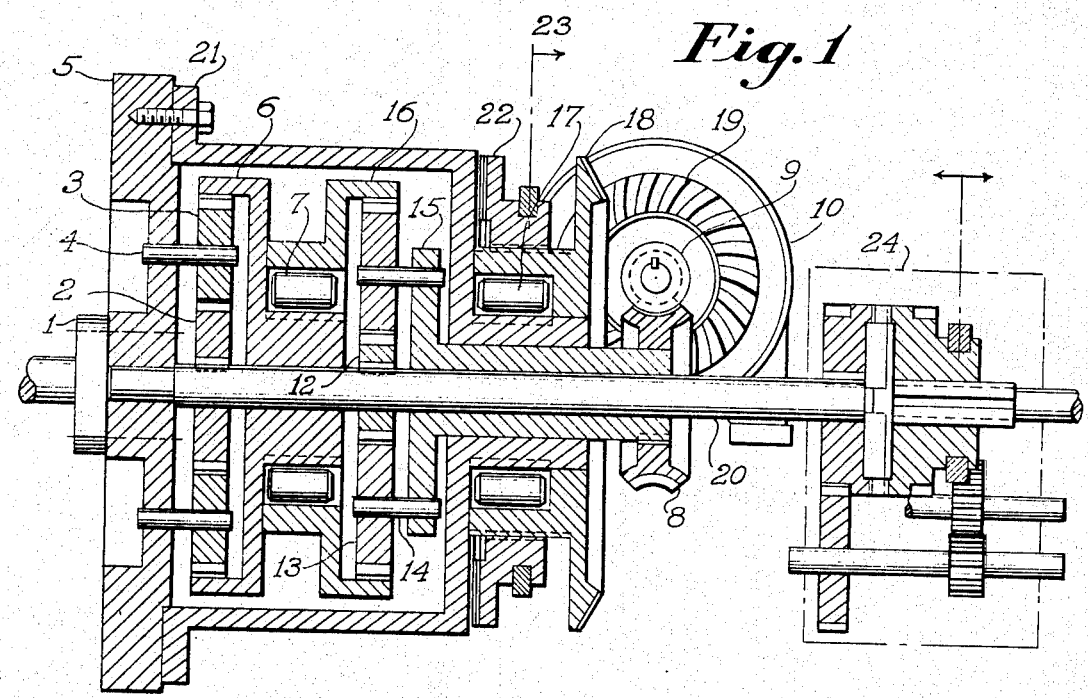
Figure 2:
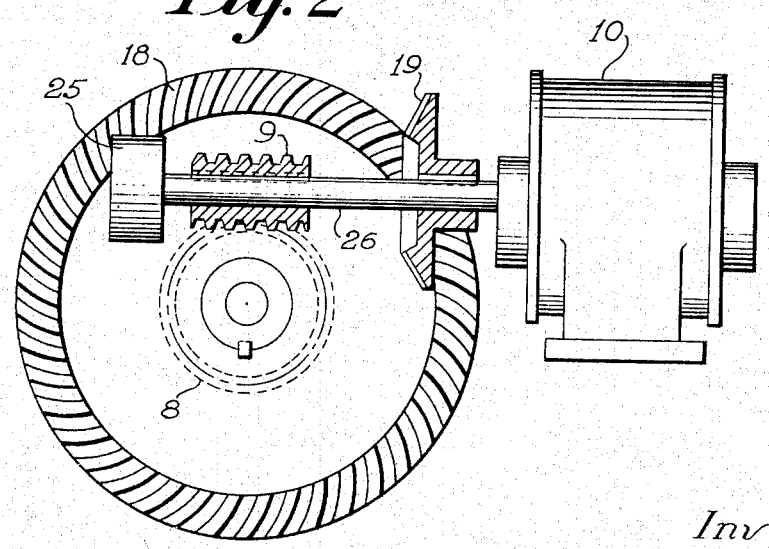

One form of the invention is illustrated in the accompanying drawing in which Figure 1 is a vertical section of the mechanism, Figure 2 is an end view of the mechanism featuring the worm gearing, the hypoid bevel gearing, the electric motor and the axial thrust bearing 25.

The transmission is a combination of a main epicyclic gear train of a certain velocity ratio and an auxiliary epicyclic gear train of a different velocity ratio.

(An epicyclic gear train is defined as a train of gear wheels in which there is a relative motion between two or more of the axes of the wheels constituting the train. It can consist of a train of gear wheels known as: sun and planetary wheels; sun, planetary wheels and internal gear wheel; differential gear wheels.)

In my invention any one of these forms of epicyclic gear trains, or a combination of them, can be used and moreover any one member of these epicyclic gear trains can be used as a driver member, i. e., connected to the source of power, as a driven member, i. e., connected to the driven shaft and as a floating or controlling member, i. e., it floats (rotates freely) when the driver rotates and the driven is stationary and by controlling its speed the driven member can be forced to rotate at various speeds with respect to the driver and vice-versa.

In my drawing I use a sun, planetary pinions and internal gear wheel arrangement, the description of which follows:

The main epicyclic gear train consists of a sun gear wheel 2 keyed to the transmission shaft 20, planetary pinions 3 rotating on pins 4 attached to the flywheel 5, known as the arm of the epicyclic train, and floating internal gear 6.

The auxiliary epicyclic gear train consists similarly of a sun wheel 12 keyed to the transmission shaft 20, planetary pinions 13 rotating on the pins 14 attached to the long hubbed wheel 15 known as the arm of the epicyclic train, and floating internal gear wheel 16 operatively coupled to floating wheel 6 by means of a one way (or also known as free wheeling) clutch 7. On the extended hub of wheel 15 is keyed a worm gear 8 which is rotated by the worm 9 driven by an auxiliary source of power such as an engine or an electric motor 10. This electric motor is regeneratively coupled to the vehicle's dynamo and storage batteries which means that the electric motor can be used as a generator to send electric current back into the storage batteries and can be utilized as an engine starter. A spider frame 21 fastened to the flywheel 5 is operatively coupled by means of another one way clutch 17 to the hypoid gear wheel 18 in mesh with the hypoid pinion 19 keyed to the shaft 26 of the worm and motor. A plate clutch 22 sliding on splines milled on the hypoid gear hub 18 can connect solidly spider frame 21 to hypoid gear 18, thus bridging the one way clutch 17 by applying the pedal or handle 23. Transmission shaft 20 enters gear box 24 which contains one set of forward gears with 1:1 ratio, one set of reverse gears with a conventional ratio and there is also a neutral position.

The electric motor 10, forming with the vehicle's generator a regenerative unit which means that the electric motor can be used as a generator to send electric current back into the storage batteries supplies the power for the auxiliary epicyclic gear train and maintains a predetermined constant speed until all members of the transmission reach synchronous rotation with respect to the engine. When an increase of the engine speed above the electric motor's speed is effected the one way clutch 17 locks the spider up to the hypoid gear 18 and from then on the power of the auxiliary epicyclic gear train is provided by the engine. Under this condition the engine drives also the electric motor as a generator. This arrangement enables the transmission to work automatically at quiet synchronous speed for all speeds of the engine.

To start the engine from the electric motor 10, plate clutch 22 is pressed into action and power flows from electric motor 10 to hypoid gearing 19, 18—to plate clutch 22, to spider 21 and to flywheel 5. Before applying the starting clutch 22 care must be taken that the gears in box 24 are in neutral position. The transmission works as follows:

At predetermined speeds of the driving shaft 1 and the electric motor 10, the throttle pedal having been released, the driven shaft 20 is stationary. The flywheel 5 with the planetary pinions 3 and the floating wheel 6 rotate and their respective speeds as well the speed of the members of the auxiliary epicyclic gear train can be calculated from the following algebraical relations:

The velocity ratio R of the epicyclic gear train, when the arm is fixed, is $$R=\frac{\text{Product of teeth in driving wheels}}{\text{Product of teeth in driven wheels}}$$

or expressed in terms of speeds, $$R=\frac{\text{Speed of last wheel relative to the arm}}{\text{Speed of first wheel relative to the arm}}$$

Let the letters S and $S^1$, C and $C^1$ and A and $A^1$ denote the speeds in revolutions per minute of the sun wheels 2 and 12, control wheels 6 and 16, and arms 5 and 15, relative to a fixed framework.

Then $$\frac{C-A}{S-A}=R \text{ and } \frac{C^1-A^1}{S^1-A^1}=R^1$$

The ratios R and $R^1$ are minus if the first and last wheels rotate in opposite directions while the arms are fixed and plus if they rotate in the same direction while the arms are fixed.

Hereby I will give an example:

*Ex. 1.*—Suppose the arm 15 makes 600 R. P. M., the gear ratio of the main epicyclic gear train is $R=-.5$ and the ratio for the auxiliary epicyclic gear train is $R^1=-.2$.

Then $$\frac{C-A}{S-A}=.5\text{ for main epicyclic gear train and}$$

$$\frac{C^1-A^1}{S^1-A^1}=.2\text{ for auxiliary epicyclic gear train}$$

From these expressions I write, $$C=1.5A-.5S \quad (2)$$

$$C^1=1.2A^1-.2S^1 \quad (3)$$

Under running conditions $C=C^1$, also $S=S^1$ and $A^1=600$, therefore:

$$1.5A-.5S=1.2A^1-.2S^1$$

$$A=\frac{1.2\times 600}{1.5}+\frac{.3}{1.5}S$$

$$A=480+.2S \quad (4)$$

When shaft 20 is at rest $S=0$ and $A=480$ and, from Equations (2) and (3):

$$C=1.5\times 480-.5\times 0=720$$
$$C^1=1.2\times 600-.2\times 0=720$$

These results illustrate that when the engine makes 480 R. P. M. or less the driven shaft 20 will be at rest. Now, pressing the throttle pedal of the engine, this will tend to increase the speed of the control wheel 6 until it equalizes with the speed of the auxiliary control wheel 16 after which the process of actual driving work starts, i. e., as wheel 6 is not allowed to increase its speed above that of wheel 16, a shunting of power to the driven shaft 20 takes place and it starts rotating. The immediate effect of this is to reduce the speed of wheel 16 (since the auxiliary driving member is kept at constant speed) which in turn will reduce the speed of wheel 6 and this in turn will further increase the speed of driven shaft 20, this cycle of operation, analogous to the electromagnetic "building up" in the dynamo machinery, going on until steady conditions are reached, a continued further depressing of the throttle pedal will continue increasing the speed of the driven shaft 20 until it reaches the speed of driving shaft 1, i. e., synchronous speed of all the members of the transmission is established.

From Equations (2), (3) and (4) values of the speeds of the driving and control members can be obtained for different speeds of the driven shaft 2.

Thus when:

| S | A | C |
|---|---|---|
| 0 | 480 | 720 |
| 100 | 500 | 700 |
| 600 | 600 | 600 |

Also:

| $S^1$ | $A^1$ | $C^1$ |
|---|---|---|
| 0 | 600 | 720 |
| 100 | 600 | 700 |
| 600 | 600 | 600 |

It will be evident to persons skilled in the art that the variable speed epicyclic gear transmission invented by me may incorporate different combinations and arrangements of:

1. Gear ratios.
2. Types of epicyclic gear drives such as external or internal planetary drives or differential epicyclic gearing.

Therefore I do not limit my invention to the specifications given above and to the drawing attached herewith but to all different combinations of variable speed epicyclic gear transmissions consisting of two or more epicyclic gear trains which are interconnected by means of one way clutches and arranged to work on the "building up" principle of my invention or as stated in my claims herewith.

I claim:

1. A planetary variable speed transmission for motor vehicles consisting of a main epicyclic gear train of a certain velocity ratio and of an auxiliary epicyclic gear train of a different velocity ratio, each epicyclic gear train consisting of a driving member, a driven member and a controlling member, said driving members connected to a main and an auxiliary source of motive power respectively, said driven members connected to the driven shaft of the transmission, said floating members connected to one another by means of a one-way clutch, a hypoid bevel gearing and a plate clutch, means operatively connecting said auxiliary source of power to the vehicle's engine through said bevel gearing and plate clutch to start the engine from rest.

2. A variable speed planetary transmission for automotive vehicles consisting of a main planetary gear train of a certain gear ratio and of an auxiliary planetary gear train of a different gear ratio, each planetary gear train consisting of a driving member alined with the engine shaft, of a driven member alined with the engine shaft and of a controlling member alined with the engine shaft; said driving member of the main planetary gear train being the engine flywheel and a number of planetary pinions rotating on pins attached to the flywheel; said driving member of the auxiliary planetary gear train being a long hubbed arm wheel and a number of planetary pinions rotating on pins attached to the long hubbed arm wheel revolving on, and co-axial with, the driven transmission shaft alined with the driving engine shaft; said driven members of both planetary gear trains are made of sun gears keyed to the driven transmission shaft alined with the driving engine shaft; said controlling members of both planetary gear trains are made of internal gear wheels revolving on, and co-axial with, the driven transmission shaft alined with the driving engine shaft; one "freewheeling-one-way" clutch coupling automatically said controlling gear wheels to equal speeds after a predetermined engine speed is being exceeded, whereby, the driven transmission shaft commences rotating; a high-efficiency non-reversible worm gear wheel keyed to said long hubbed arm wheel of the auxiliary planetary gear train, a worm in mesh with said worm gear and driven from an auxiliary electric motor at constant speed; a hypoid bevel gearing embodying a bevel gear wheel rotating on, and co-axial with, said long hubbed arm wheel, and a bevel pinion offset from said bevel gear wheel and keyed to the shaft of the auxiliary electric motor; an annular spider or cylindrical frame firmly secured to the engine flywheel and extending co-axially over the hub of said hypoid gear wheel, a second "free-wheeling-one-way" clutch coupling automatically said spider frame with said hypoid gear wheel to equal speeds after the engine speed exceeds the speed of the worm gear as provided by the electric motor, whereby, all members of the transmission rotate at synchronous speed for all engine speeds.

3. A variable speed transmission for motor vehicles consisting of a main differential epicyclic gear train of a certain gear ratio and an auxiliary differential epicyclic gear train of a different gear ratio, each differential epicyclic gear train consisting of a driving member alined with the engine shaft, of a driven member alined with the engine shaft and of a controlling member alined with the engine shaft; means operatively connecting said driving member of the main differential epicyclic gear train to the shaft of an engine; a non-reversible high efficiency worm gearing and an auxiliary source of power, means operatively applying said auxiliary power through said worm gearing to the driving member of the auxiliary differential epicyclic gear train at constant speed; means operatively connecting said driven members of both differential epicyclic gear trains to a driven shaft; means operatively connecting said controlling member of the main differential epicyclic gear train to said controlling member of the auxiliary epicyclic gear train through a free-wheeling one way clutch, whereby at stand still of the driven shaft, with the engine running below a predetermined speed, said controlling gear wheels are not locked to equal speed, and when the predetermined engine speed is exceeded, automatic locking of the controlling wheels takes place and the driven shaft starts rotating.

JOHN PETER POPOFF.